(No Model.) 3 Sheets—Sheet 2.

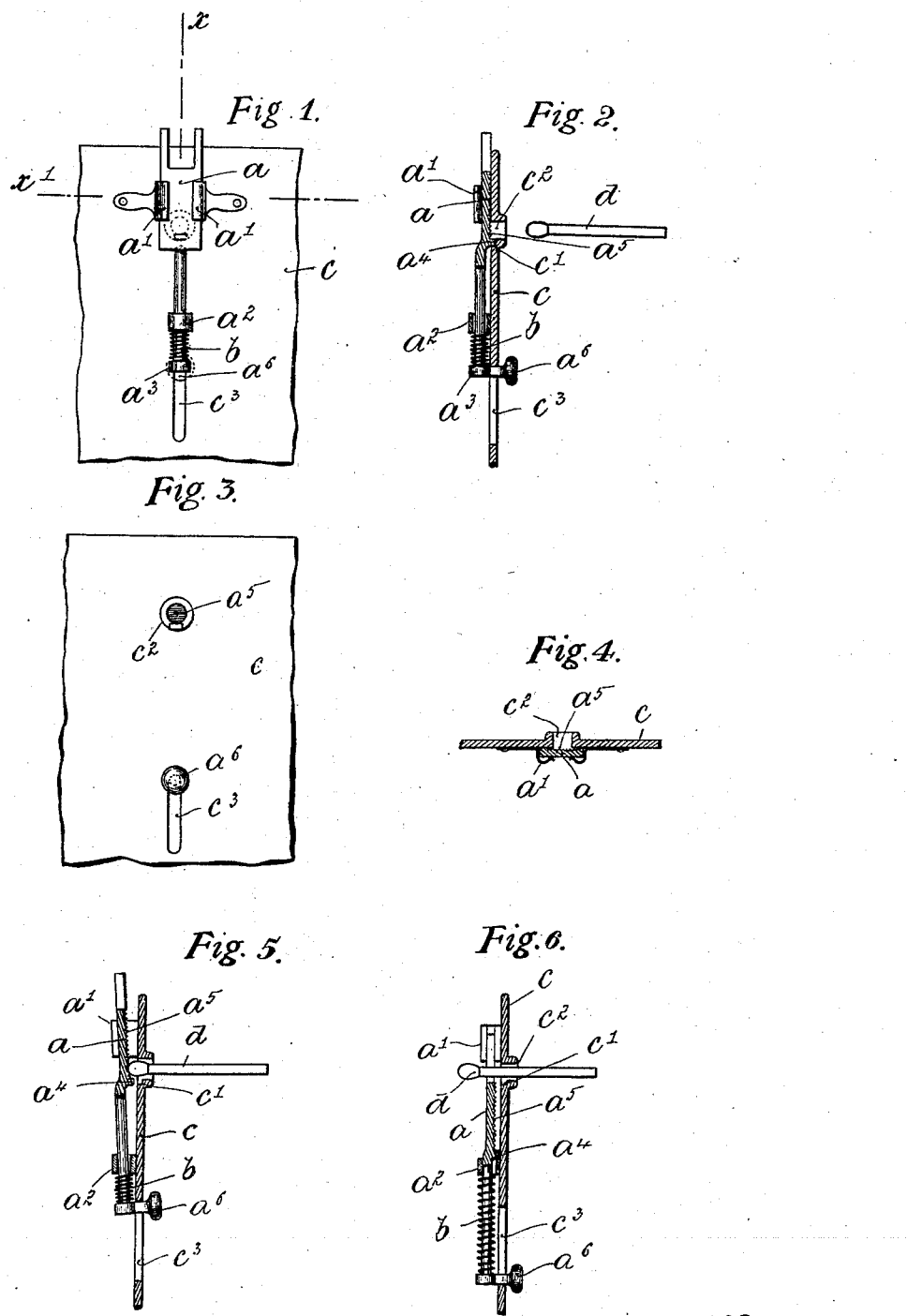

H. PAYTON.
MATCH STRIKER.

No. 580,710. Patented Apr. 13, 1897.

WITNESSES
J. B. Keefer
Geo. W. Rea.

INVENTOR
Henry Payton
by James L. Norris
Attorney (No Model.) 3 Sheets—Sheet 3.

H. PAYTON.
MATCH STRIKER.

No. 580,710. Patented Apr. 13, 1897.

WITNESSES

INVENTOR
Henry Payton
by James L. Norris
attorney

UNITED STATES PATENT OFFICE.

HENRY PAYTON, OF BIRMINGHAM, ENGLAND.

MATCH-STRIKER.

SPECIFICATION forming part of Letters Patent No. 580,710, dated April 13, 1897.

Application filed January 5, 1897. Serial No. 618,063. (No model.) Patented in England August 17, 1896, No. 18,146.

*To all whom it may concern:*

Be it known that I, HENRY PAYTON, manufacturing jeweler, a subject of the Queen of Great Britain, residing at Vyse Street, Birmingham, England, have invented certain new and useful Improvements in Match-Strikers, of which the following is a specification, and for which I have obtained Letters Patent of Great Britain, dated the 17th day of August, 1896, and numbered 18,146.

This invention relates to match-strikers for various purposes—such, for instance, as for cycle and other lamps, match-boxes, gas-burners, and the like, and has for its object an automatic or spring-actuated striker; and it consists, primarily, of a traversing striker set by hand and released by the impingement of a match against it.

Figure 7:
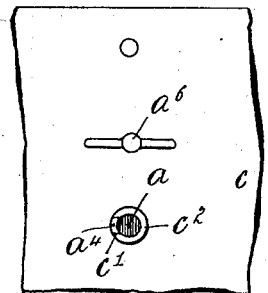
Figure 8:
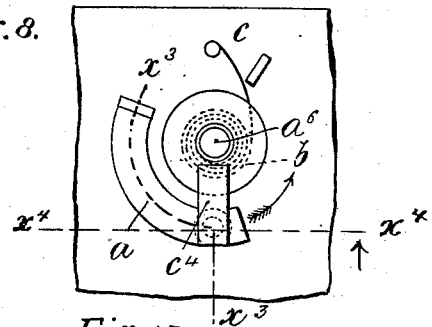
Figure 12:
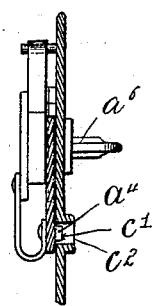
Figure 13:
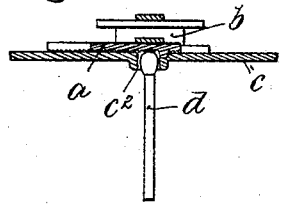
Figure 9:
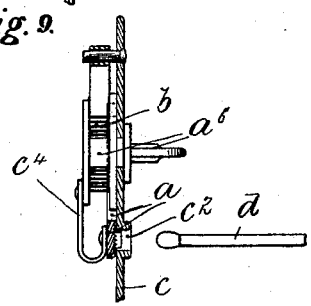
Figure 10:
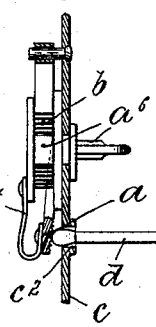
Figure 11:
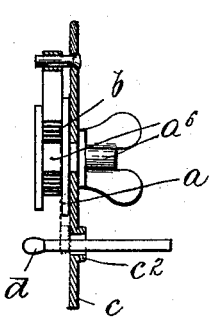
Figure 14:
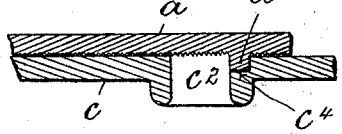
Figure 15:
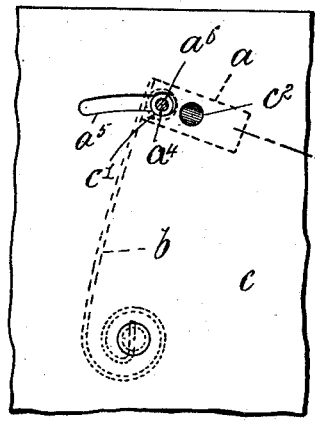
Figure 16:
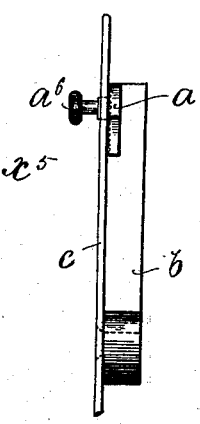
Figure 17:
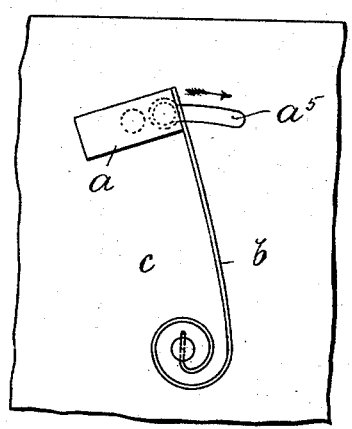
Figure 18:
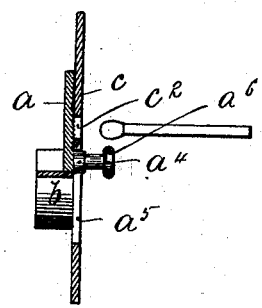
Figure 19:
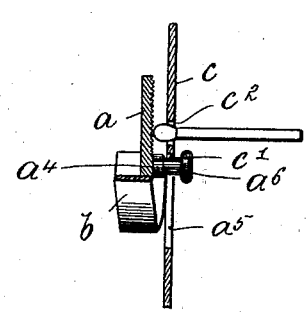
Figure 20:
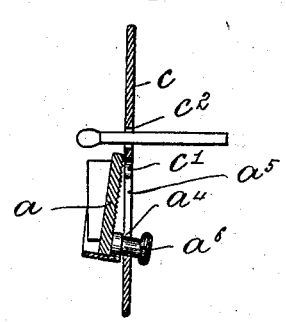

Figure 1 of the accompanying drawings represents in back elevation one form of automatic match-striker released by the impingement of the head of a match to be lighted against the striking-plate, which is caused to traverse or wipe in a rectilinear direction over the said match-head by the energy of a spring. The said view shows the striker set. Fig. 2 represents a vertical section of Fig. 1 upon the dotted line $x$, showing the match just before it is made to impinge against the striker. Fig. 3 represents a front elevation of Fig. 1; and Fig. 4 is a cross-section upon the dotted line $x'$, Fig. 1. Fig. 5 represents a like view as Fig. 2, but with the match shown impinging against and forcing back the striker, thus taking the catch which holds the same in its set position out of a sinking in its face. Fig. 6 represents a like section as Figs. 2 and 5, but showing the striker at rest after having been shot or drawn over and taken beyond the match-head, which is thus ignited. Fig. 7 represents a front elevation of a modified form of my invention in which the striker is made to travel in a curvilinear course instead of in a rectilinear direction and is actuated or shot by a volute spring. Fig. 8 is a back elevation of the same. Fig. 9 is a vertical section of Fig. 8, showing the striker in its set position and just before the impingement of the match thereon. Fig. 10 is a like section as Fig. 9, but with the match shown impinging against and releasing the striker, which is then momentarily and swiftly drawn over the head; hence the ignition of the match when the parts assume the positions shown in Fig. 11. Fig. 12 is a section on the line $x^3$ $x^3$ of Fig. 8, but with the striker-impelling mechanism in elevation. Fig. 13 is a section upon the dotted line $x^4$ of Fig. 8, looking in the direction of the arrow. Fig. 14 shows, on an enlarged scale, a section of a part of the striker-plate and the hole in the casing of a box, lamp, or the like through which the match passes. Fig. 15 is a front elevation of another form of striker in which the striker-plate is impelled in a curvilinear path. Fig. 16 is a side elevation of the same, and Fig. 17 a back elevation thereof. Fig. 18 is a section upon the dotted line $x^5$, Fig. 17, showing the positions of the parts before the impingement of the match. Fig. 19 is a like section, but with the match pushing the holding-catch of the striker out of its holding position, so as to release the same. Fig. 20 is also a like view as Fig. 18, but showing the striker impelled beyond the range of the match, which is thus struck or ignited.

In Figs. 1 to 6, $a$ is a reciprocating striker working between guides $a'$ $a^2$ and impelled by a spring $b$, located between an end $a^3$ and the guide $a^2$, and when the striker is in its set position a catch $a^4$ engages with a sinking $c'$, formed in a plate or carrier $c$. $c^2$ is a hole in this plate, through which the match $d$ is introduced and impinged against the striking-surface $a^5$, which may be serrated or roughened or provided with any other suitable striking-contact, such, for instance, as a knife-edge. The striker is set by a knob or other finger-hold $a^6$, whose stem works in a slot or piercing $c^3$ in the carrier-plate. I prefer to lift the striking-surface from the face of the carrier-plate, over which it is reciprocated, so as to prevent injury of the opposed surfaces.

Operation: To set the striker, push the same upward until the catch $a^4$ engages the hole or sinking $c'$, when the parts are retained in their set positions, as shown in Figs. 1 and 2. To strike a match, thrust the head end of the same through the hole $c^2$, when the striker is pushed backward, which is admitted of by the spring-guides $a'$ when the catch $a^4$ is removed from the hole $c'$, and the force of the spring now comes into play and shoots the striker by its impelling action, which in its traverse over and past the head of the match ignites the same, as represented in Fig. 6.

In Figs. 7 to 14, $a$ is the striker, mounted upon an axis or turn $a^6$ and having the inner end of an impelling-spring $b$ connected to it, while the other end of the spring is attached to the carrier-plate $c$ and with a connecting-spring $c^4$ uniting the striker with the turn. $a^4$ is a catch engaging with a hole $c'$ in the plate $c$, while $c^2$ is the hole through which the head of the match $d$ is thrust.

The operation consists in rotating the axis or turn $a^6$ until the catch $a^4$ comes opposite and falls into the hole $c'$, when the striker is retained in its set position. Then to strike a match thrust the same through the hole $c^2$, when the striker is released by the catch being taken out of the hole and is shot past and beyond the head of the match by the pent-up force of the propelling-spring, thereby igniting the same.

In Figs. 15 to 20, $a$ is the striker, carried by the outer end of an impelling-spring $b$, whose inner end is connected to a plate or carrier $c$, having a slot $a^5$ within it wherein the neck of a setting-stud $a^6$ works, and the carrier is retained by a catch or collar $a^4$ on the said neck, engaging in the hole $c'$ in the slot $a^5$. $c^2$ is the hole through which the match $d$ is passed. After the striker is set the match is thrust through the hole $c^2$ and impinged against the striker, whereby the catch $a^4$ is released from the hole $c'$ and the said striker is, by the impelling force of the spring $b$, shot over and past the match-head, which is thus ignited. The match, after being ignited, if required to light a lamp interiorly, is kept in the inside and passed up to the wick, but if the light is required exteriorly then instantly it is struck it is sharply withdrawn.

Instead of the tail end of the striker passing out of the range of the match it is obvious that a hole near the end of the striker-plate for the match to pass through would give the necessary clearance. Further, it is also obvious that the striker may be mounted on a frame and left naked, in which case no hole would be required for the match to be thrust through.

Having fully described my invention, what I desire to claim and secure by Letters Patent is—

1. A spring-actuated match-striker, consisting of a traversing striker arranged to be set by hand and released by the impingement of a match against it, substantially as described.

2. In a match-striker, the combination with a spring-impelled striker, a catch for holding said striker retracted against the tension of its spring, and means for permitting said striker to yield when a match is impinged thereagainst to release the catch and cause the striker to sweep over and ignite the match, substantially as described.

3. In a match-striker, the combination with a carrier having an orifice for the introduction of a match, a striker arranged to move past said aperture, a spring for actuating said striker, a catch for holding said striker retracted against the tension of said spring, and means for maintaining said catch in its operative position to hold the striker in its retracted position but permitting the catch to be released by the impingement of a match against the striker to cause the striker to sweep over and ignite the match, substantially as described.

4. In a match-striker, the combination with a carrier, of a spring-impelled striker movably attached thereto, and a catch for holding said striker in its retracted position, said carrier having an orifice disposed over said striker for the introduction of a match to release the striker and cause it to sweep over and ignite the match, substantially as described.

5. In a match-striker, the combination with a carrier having an orifice for the introduction of a match, of a reciprocating striker movable in yielding guides fixed on the rear of the carrier, a spring for thrusting said striker over and past said orifice, and a catch for holding said striker retracted against the tension of said spring, whereby when a match is introduced into said orifice and impinged against the striker, the latter is released and caused to sweep over and ignite the match, substantially as described.

6. In a match-striker, the combination with the carrier $c$ having an orifice $c^2$ and slotted as at $c^3$, yielding guides $a'$, a striker $a$ movably arranged in said guides and provided with a knob $a^6$ projecting through said slot, a spring for thrusting said striker over and past said orifice, and a catch $a^4$ arranged to engage a recess $c'$ in the carrier and hold the striker retracted against the tension of the spring, whereby when a match is introduced into said orifice and impinged against the striker, the latter is released and sweeps over and ignites the match, substantially as described.

In testimony whereof I have hereunto set my hand in presence of two subscribing witnesses.

HENRY PAYTON.

Witnesses:
 HENRY SKERRETT,
 ARTHUR T. SADLER.